United States Patent [19]
Heiskari et al.

[11] Patent Number: 5,802,457
[45] Date of Patent: Sep. 1, 1998

[54] METHOD FOR REALIZING AMBIENCE LISTENING, AND RADIO UNIT

[75] Inventors: Mika Heiskari, Liminka; Mika Lehmusto, Kerava, both of Finland

[73] Assignee: Nokia Telecommunications Oy, Espoo, Finland

[21] Appl. No.: 553,295

[22] PCT Filed: Mar. 21, 1995

[86] PCT No.: PCT/FI95/00151

§ 371 Date: Apr. 19, 1996

§ 102(e) Date: Apr. 19, 1996

[87] PCT Pub. No.: WO95/26614

PCT Pub. Date: Oct. 5, 1995

[30] Foreign Application Priority Data

Mar. 24, 1994 [FI] Finland ............. 941382

[51] Int. Cl.$^6$ ............................. H04B 1/40
[52] U.S. Cl. ............. 455/88; 455/411; 455/517; 455/414; 340/825.44; 367/197
[58] Field of Search ................... 455/411, 517, 455/518, 521, 512, 525, 516, 88, 414; 340/825.44, 825.46; 367/197, 198, 199; 381/57, 58

[56] References Cited

U.S. PATENT DOCUMENTS

| | | | |
|---|---|---|---|
| 4,060,803 | 11/1977 | Ashworth, Jr. | 340/409 |
| 4,640,987 | 2/1987 | Tsukada et al. | 379/62 |
| 5,239,294 | 8/1993 | Flanders et al. | 340/325.34 |
| 5,384,847 | 1/1995 | Hendrickson et al. | 380/23 |
| 5,400,011 | 3/1995 | Sutton | 340/566 |

FOREIGN PATENT DOCUMENTS 2 264 210   8/1993   United Kingdom.

*Primary Examiner*—Edward F. Urban
*Assistant Examiner*—Darnell R. Armstrong
*Attorney, Agent, or Firm*—IP Group of Pillsbury Madison & Sutro LLP

[57] ABSTRACT

A method for activating ambiance listening in which a first, mobile radio unit transmits ambient sounds and voice to a second radio unit over a radio path. To check that the second radio unit has listening authority, the second radio unit commands the first radio unit to transmit ambient sounds and voice to the second radio unit. In response, the first radio unit checks the listening authority of the second radio unit, and, if the second radio unit has the listening authority, the first radio unit starts transmitting ambient sounds and voice to the second radio unit.

13 Claims, 2 Drawing Sheets

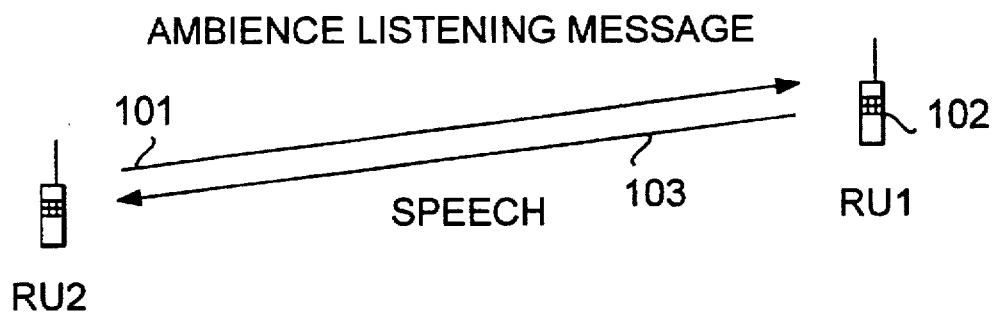
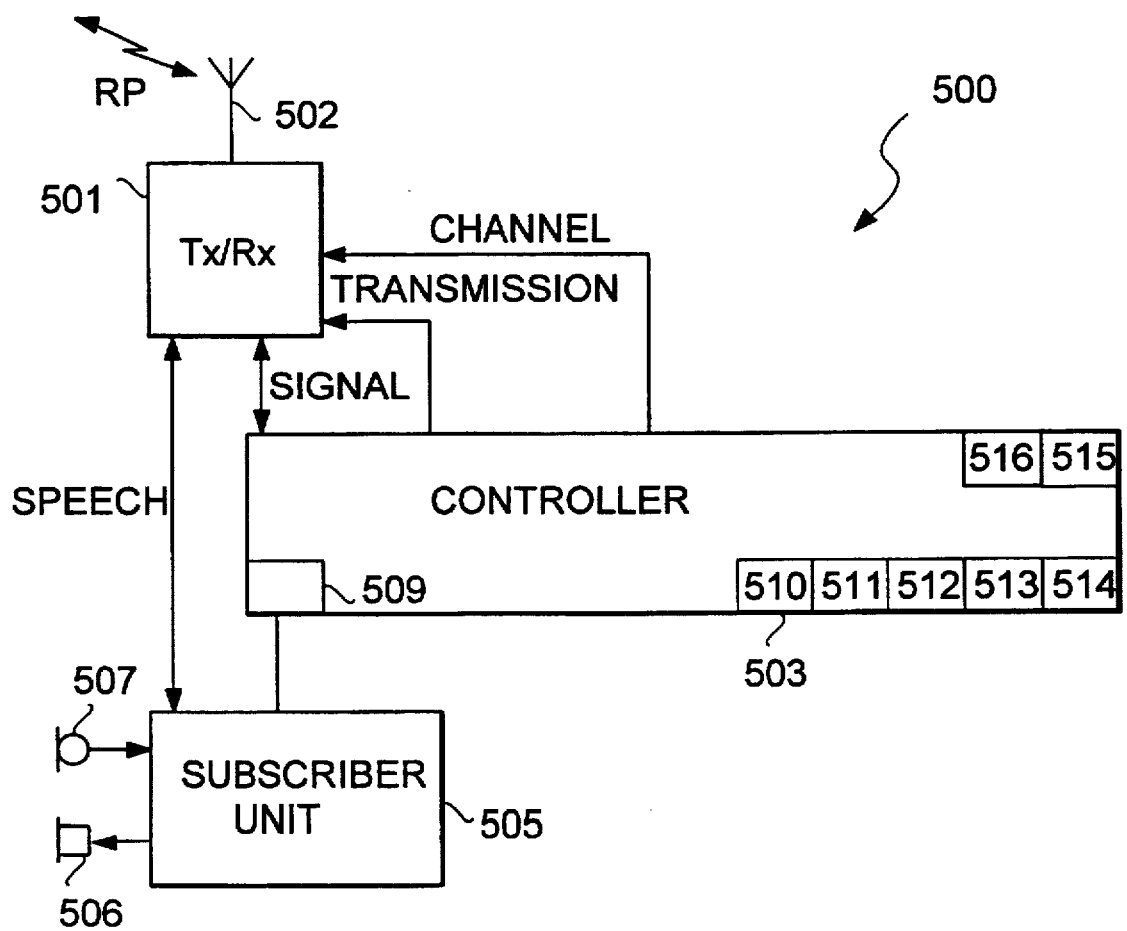

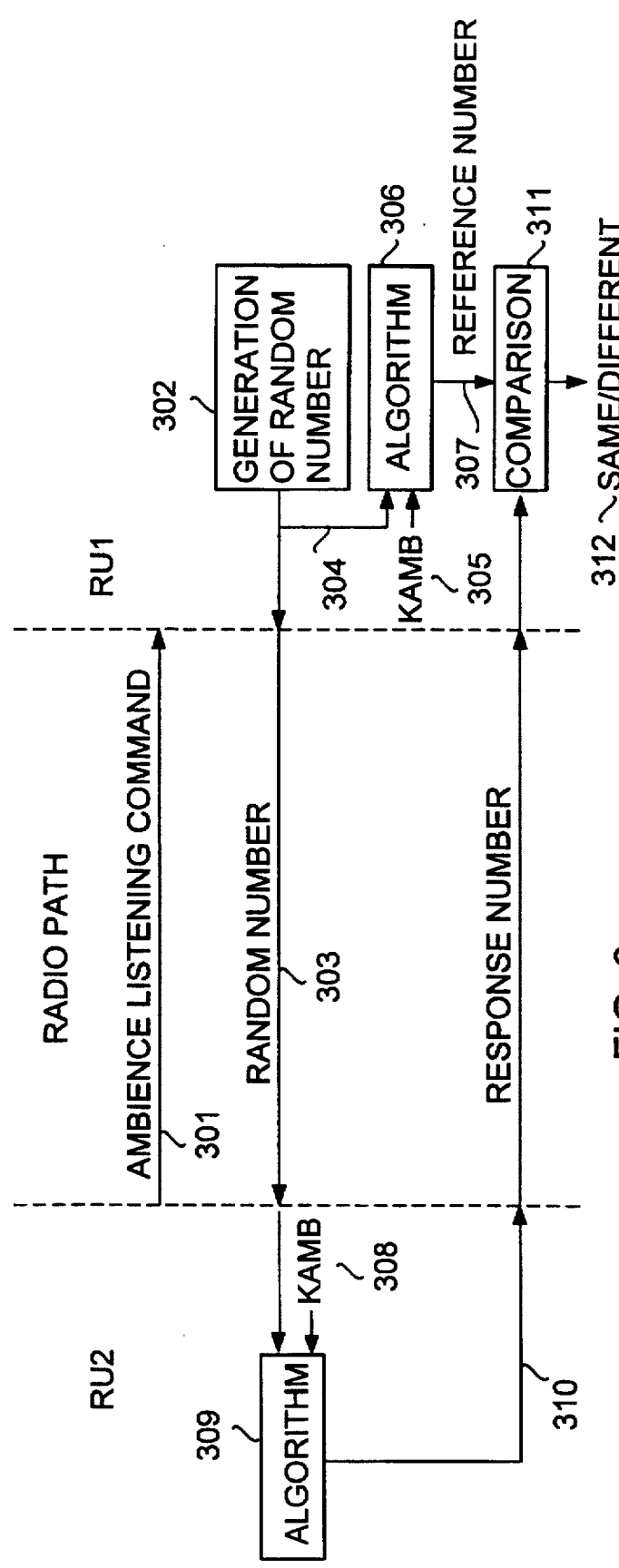

METHOD FOR REALIZING AMBIENCE LISTENING, AND RADIO UNIT

This application claims benefit of international application PCT/Fl 95/00151, filed Mar. 21, 1995.

FIELD OF THE INVENTION

The invention relates to a method for activating ambience listening in which a first mobile radio unit transmits ambient sounds and voice to a second radio unit over a radio path.

BACKGROUND OF THE INVENTION

The invention relates to radio telecommunications systems. A subscriber of a radio telecommunications system, i.e. a radio unit or a subscriber station, such as a mobile phone or some other means of communication, may be registered in a radio network or radio system through system or traffic channels maintained by the base stations of the radio network.

Apart from system channels of radio telecommunications systems, direct mode channels can also be used, i.e. direct mode operation can be applied. Radio units or subscriber stations using direct mode operation do not communicate with a radio network or its base stations. Direct mode channels are frequencies or channels at which mobile phones or other means of communication are able to communicate directly with one another without going through components of the system.

Direct mode channels are typically used in cases where, e.g., a plural number of hand-portable mobile phones communicate with one another at such a distance from the base station that system channels cannot be used.

Another important use of direct mode channels is in the addition of capacity when traffic increases rapidly in one part of the service area of the system, e.g. at one point of the radio network.

A direct mode channel is also called a direct or simplex channel, or a simplex connection. A direct mode channel is a channel that is typically not at all used by the system. It may be, for example, a channel with the same channel spacing as the channels of the system, e.g. 12.5 kHz or 25 kHz. Of the mobile phones operating on the direct mode channel, the transmitting station has tuned its transmitter to the channel and transmits speech or data information. The other mobile phones set to direct mode operation have tuned their receivers to the same channel, whereby they are able to directly hear the transmission.

On a direct mode channel, both analog modulation and digital modulation can be used. The mobile phone transmitting on the channel can also send signalling information, such as information about access rights and priorities or a group operating on the channel. On a direct mode channel, messages can be encrypted, or speech can be transmitted in clear form.

Radio units, i.e. subscriber stations, operating in direct mode communicate with other radio units on a direct mode channel, without necessarily being in direct contact with the base stations of the radio network.

In private mobile radio systems PMR, it is conventional to use an ambience listening function, in which the speech paths of a radio unit, such as a mobile phone, are opened and the transmitter is activated without any indication to the user interface of the mobile phone. In prior art solutions, it has been possible to activate ambience listening either from the mobile phone listened to or through the system from another terminal equipment. When the ambience listening function is activated from the mobile phone listened to, the call is forwarded to a predetermined number, usually to a dispatcher or a station on duty.

The direct mode channels of the prior art operate on a so-called open channel principle. This means that a mobile station can call another mobile station or other mobile stations using selective calls. Actual signalling is not used in the prior art systems.

On a direct mode channel of the prior art, ambience listening has not been realized. It has been impossible to activate the ambience listening function from another mobile phone that operates on the direct mode channel. Yet this would be an important characteristic precisely in the PMR systems, since PMR systems are often used by the authorities, e.g. by the police and in rescue operations, where it is of great advantage if a radio unit can be activated by remote control to transmit ambient sounds and voice. An example for a situation where this characteristic is needed is a situation where a first radio unit, i.e. mobile station, has fallen into the wrong hands and a second radio unit wants to secretly listen to what is spoken near the first radio unit.

SUMMARY OF THE INVENTION

It is an object of the present invention to provide a method and radio units by which ambience listening can be realized on a direct mode channel.

Another object of the invention is to solve the problems of the prior art solutions, i.e. to make it possible to use the ambience listening function in radio units communicating on a direct mode channel.

Yet another object of the invention is to provide a method and a radio unit by which ambience listening can be conducted safely, e.g. on a direct mode channel. The object of the invention is thus that not anybody can listen to just anyone by using the ambience listening function, but the ambience listening function can be activated from specified entities only.

This new kind of method for activating ambience listening is achieved with the present invention, the method being characterized in that the second radio unit commands the first, mobile radio unit to transmit to the second radio unit the ambient sounds and voice; in response to the command given by the second radio unit, the first radio unit checks the listening authority of the second radio unit; and if the second radio unit has the listening authority, the first radio unit starts transmitting ambient sounds and voice to the second radio unit.

The invention also relates to a radio unit for ambience listening in which the radio unit transmits ambient sounds and voice to a second radio unit over a radio path, the radio unit comprising a transceiver unit and means for transmitting the ambient sounds and voice through the transceiver.

A radio unit according to a first embodiment of the invention further comprises memory means for storing the identifiers of the other radio units that are authorized to activate ambience listening at the radio unit, and comparison means for comparing the identifiers contained in the activate-ambience-listening messages transmitted by the other radio units with the identifiers stored in the memory means and, if it appears in the comparison that the same identifier is found in the memory means and in the activate-ambience-listening message, for activating ambience listening at the radio unit.

A radio unit according to a second embodiment of the invention is characterized by further comprising means for generating a random number and transmitting it to a radio unit that has commanded the first radio unit to start ambience listening; memory means for storing a key number characteristic of the radio unit; means for computing a reference number from said random number and said key number and for storing that reference number; means for comparing the reference number with a response number received by the radio unit and computed by some other radio unit and, if the numbers are identical, for activating the ambience listening function at the radio unit.

The invention also relates to a radio unit for ambience listening in which the radio unit transmits ambient sounds and voice to a second radio unit over a radio path, the radio unit comprising a transceiver unit.

This radio unit of the invention is characterized by further comprising memory means for storing the random number received by the radio unit and the key numbers of such radio units whose ambience listening function the radio unit is authorized to activate; and means for computing a response number from the random number and the key number of the other radio unit that has sent the random number, and for sending the response number to the other radio unit.

The invention is based on the idea that the second radio unit can activate the ambience listening function at the first radio unit by remote control without any indication to the user of the first radio unit that ambient sounds and voice is being transmitted to the second radio unit.

The first embodiment of the invention is based on the idea that a first radio unit contains a list of the identifiers of the radio units that are authorized to activate that radio unit, and the list is used for ensuring that only authorized radio units can activate the ambience listening function.

The second embodiment of the invention is based on the idea that a first radio unit generates a random number and transmits it to a second radio unit that attempts to activate the ambience listening function, and computes a reference number from the random number and the key number characteristic of the radio unit. The second radio unit computes a response number from the same random number and the key number—stored in its memory—that is characteristic of the first radio unit, comparing it with the reference number. If the numbers are identical, the first radio unit starts ambience listening and transmits the ambient sounds and voice to the second radio unit.

The advantage of this kind of method for ambience listening and of this kind of radio unit is that they make it possible to realize ambience listening between radio units, such as mobile stations, communicating on a radio channel, such as a direct mode channel.

The advantage of the invention is that with the invention it is possible to specify the radio units that are authorized to activate ambience listening at some other radio unit. This is checked by identifying and approving the listening radio unit even if only two radio units communicating e.g. on a direct mode channel are involved. Ambience listening or any attempts thereof by unauthorized listeners are hereby prevented.

BRIEF DESCRIPTION OF THE DRAWINGS

In the following, the invention will be described in greater detail with reference to the attached drawings, wherein:

FIG. 1 is a signal flow diagram illustrating the operation of the method and radio unit of the invention, FIG. 2 is a schematic representation illustrating a message according to a first embodiment of the invention for activating ambience listening, FIG. 3 is a schematic presentation illustrating the operation of a second embodiment of the invention, and FIG. 4 is a block diagram showing a radio unit according to the invention.

DETAILED DESCRIPTION OF PREFERRED EMBODIMENTS OF THE INVENTION

FIG. 1 is a signal flow diagram illustrating the operation of the method and radio unit according to the invention. The invention includes a method for activating the ambience listening function through a direct mode channel from a second radio unit RU2 such that a first radio unit RU1 starts transmitting ambient sounds and voice to the second radio unit RU2. In the invention, the radio unit activating the ambience listening, e.g. radio unit RU2, sends an ambience listening message 101 to the mobile phone RU1 listened to. In response to the message, the first radio unit RU1 checks 102 whether the second radio unit RU2 is authorized to activate the ambience listening function at the first radio unit RU1 and, if the second radio unit is authorized to listen, the first radio unit RU1 starts to transmit ambient sounds and voice to the second radio unit RU2.

FIG. 2 is a schematic representation illustrating a message according to the first embodiment of the invention for activating ambience listening. In the invention, the radio unit RU2 activating the ambience listening function sends the radio unit RU1 listened to an activate-ambience-listening message. The message contains the fields shown in FIG. 2. Field 201 contains the address of the first radio unit RU1, i.e. the radio unit listened to. Field 202 contains the identifier of the message, i.e. the identifier of the activate-ambience-listening message. Field 203 contains the address of the second radio unit RU2, i.e. the radio unit activating the ambience listening function. Field 204, which is an optional field, can contain the priority of the message. Field 205 in FIG. 2 determines for how long the ambience listening function is activated. If the direct mode channel has a reverse channel in use, the ambience listening function can be deactivated by using it, so the listening time field 205 or its contents are not needed. If reverse signalling cannot be transmitted, the listening time field 205 must be used.

In the basic embodiments of the invention, the ambience listening function takes up the whole capacity of a direct mode channel. If one wants the ambience listening function to use some other direct mode channel, the channel to be used can be indicated in field 206 of the ambience listening message.

In the first embodiment of the invention, a list of mobile phones, i.e. second radio units RU2, that are authorized to receive ambient sounds and voice of the radio unit RU1 listened to is programmed in the radio unit RU1 listened to or more particularly in its memory means. The authority of the listener RU2 is thus programmed in the radio unit RU1 listened to.

FIG. 3 is a schematic representation illustrating the operation of a second embodiment of the invention. In the invention, each radio unit or mobile phone RU1 listened to has an individual ambience listening key 305, Kamb. The operation starts as the second radio unit RU2 commands 301 the first radio unit RU1 to shift to an ambience listening state. Having received the command 301 to shift to the ambience listening state, i.e. having received e.g. an activate-ambience-listening message or command 301, the radio unit RU1 listened to, i.e. the first radio unit RU1, generates 302 and transmits 303 a random number to the listening radio unit RU2, i.e. the second radio unit, stores the random number in the memory or sends it for further processing. The second radio unit RU2 computes 309 by an algorithm a response number from the random number and the key number Kamb characteristic of the first radio unit RU1, and sends 310 the response number to the first radio unit RU1. Correspondingly, the first radio unit computes 306 by a similar algorithm a reference number 307 from the previously generated 302 random number 304, and compares 311 the response number 310 obtained from the second radio unit RU2 with this reference number. If the response number 310 is the same as the reference number 307, the first radio unit RU1 will be convinced that the second radio unit is authorized to listen to the ambient sounds and voice of the first radio unit. The first radio unit RU1 then activates the ambience listening function. If, on the other hand, the response number 310 and the reference number 307 are different, the ambience listening function is not activated. Thus, the key numbers, i.e. the ambience listening keys, of all those first radio units RU1, i.e mobile phones, which the second radio unit RU2 is authorized to listen to are programmed in the second radio unit RU2, i.e. the listening mobile phone.

FIG. 4 is a block diagram of a radio unit of the invention. The figure shows a typical radio unit 500 communicating on a traffic channel, i.e. a mobile phone, mobile station or, e.g., a subscriber station used by the subscriber. The function of a transceiver (TX/RX) 501 is to tune to the channel used. With the transceiver 501 is connected an antenna 502, which is connected with the radio path RP. Usually, radio frequencies in the range of 60 to 1000 MHz (VHF and UHF ranges) are used, but other frequencies are also possible. On the radio path RP, analogue modulation can be used, the modulation being then usually phase modulation. Other kinds of modulation can also be used. Signalling can be transmitted e.g. by a voice-frequency subcarrier wave (FFSK). Transmission over a radio path can also be digital.

A user interface 505 may comprise electro-acoustic transducers, typically a headphone 506 and a microphone 507, and optionally buttons for starting and ending a call, and for dialling. Since in a trunking system, and especially on a direct mode channel, transmission over a radio path RP is advantageously unidirectional, the subscriber station usually also has a push-to-talk button that must be depressed during the transmission. The push-to-talk button is not shown in FIG. 4. In ambience listening, a push-to-talk button, understandably, is naturally not depressed at the radio unit whose ambient sounds and voice is being transmitted to a second radio unit.

The function of a controller 503 is to control the operation of the subscriber station. The controller 503 is connected with the user interface 505, from which it receives signals e.g. for starting and ending a call. In the invention, the signals may also be received from the radio path RP. The controller 503 may also give the user, via the user interface 505, voice or visual signals that relate to the operation of the mobile phone and/or the radio telecommunications system. The controller 503 is connected to the transceiver TX/RX 501. The channel used by the transceiver is allocated by the controller 503, i.e. the transceiver 501 tunes to the channel, i.e. radio frequency and a suitable time slot, allocated by the controller 503. The radio unit of the invention is able to tune to a direct mode channel. The transceiver 501 is also activated by the controller 503. The controller 503 receives and transmits signalling messages through the transceiver 501. A radio unit 500, RU1, RU2 (FIGS. 1 and 2) of the invention communicating on a direct mode channel can be used, e.g. in a radio system that comprises a radio network with at least one base station and mobile stations and optionally one or more repeater stations that transmit traffic between at least one base station and subscriber stations communicating on a direct mode channel. The radio unit then comprises a transceiver unit 501 for receiving transmissions sent by other radio units, for sending transmissions to these other radio units, and for controlling the functions of the radio unit of a control unit 503, and a user interface 505.

The radio unit 500, RU1 of the first embodiment of the invention further comprises memory means 509 for storing the identifiers of the other radio units RU2 that are authorized to activate ambience listening at the radio unit concerned. The radio unit 500, RU1 of the first embodiment also comprises means 510 for comparing the identifiers contained in the messages 101 (FIG. 2) transmitted by the other radio units RU2 for activating ambience listening with the identifiers contained in the memory means 509 and, upon detecting the same identifier in the memory means and the ambience listening message 101 (FIG. 2), activating the ambience listening function at the first radio unit RU1.

A radio unit RU1 (FIG. 3) of the second embodiment of the invention comprises means 511 for generating a random number and transmitting it to a radio unit RU2 that has commanded radio unit RU1 to activate the ambience listening function. The radio unit 500 (FIG. 3) further comprises memory means 512 for storing a key number characteristic of the radio unit, and means 513 for computing a reference number from the random number and the key number and for storing the reference number, and means 514 for comparing the reference number with a response number received by the radio unit and computed by some other radio unit and, if the numbers are identical, for activating ambience listening at the radio unit.

The second radio unit for ambience listening according to the second embodiment of the invention, i.e. the radio unit that sets, if possible, the first radio unit to the ambience listening state by remote control, further comprises a transceiver unit and memory means 515 for storing the random number received by the radio unit, and for storing the key numbers of radio units whose ambience listening function the radio unit is authorized to activate. The radio unit further comprises means 516 for computing a response number from the random number and the key number of the other radio unit that has transmitted the random number, and for transmitting the response number to said other radio unit.

The radio units of the invention may communicate on direct mode channels.

The drawings and the description associated therewith are intended only to illustrate the idea of the invention. The method of the invention for realizing ambience listening and the radio unit of the invention may vary in their details within the scope of the claims. Although the invention is described above mainly in connection with radio units communicating on a direct mode channel, the invention can also be used with other kinds of mobile stations and mobile phones.

We claim:

1. A method for activating ambiance listening, in which a first, mobile radio unit, having an electroacoustic transducer transmits ambient sounds, which may include voice, detected by said electroacoustic transducer to a second radio unit, over a direct mode radio path, comprising the steps of:
   the second radio unit commanding the first radio unit to transmit such ambient sounds as are detected by said electroacoustic transducer, to the second radio unit, by sending the first mobile radio unit, on a direct mode radio channel, an activate-ambiance listening message that contains an identifier of the second radio unit, and without causing a user interface of the first, mobile radio unit to provide any indication of such commanding;

the first mobile radio unit checking, in response to said commnanding by the second radio unit, a listening authority of the second radio unit, and the first, mobile radio unit starting ambiance listening and transmitting ambient sounds, which may include, voice to the second radio on a direct mode radio channel, only if the second radio unit is determined as a result of said checking, to have listening authority.

2. The method of claim 1, wherein:

as the second radio unit performs said commanding of the first, mobile radio unit to transmit the ambient sounds to the second radio unit, the second radio unit transmitting on a direct mode channel the identifier of a particular direct mode radio channel on which the second radio unit wants the first, mobile radio unit to transmit the ambient sounds.

3. The method of claim 1, further comprising:

the second radio unit commanding the first, mobile radio unit to stop transmitting ambient sounds to the second radio unit on a direct mode radio channel by sending the first, mobile radio unit a deactivate-ambiance-listening message on a reverse signalling channel.

4. The method of claim 1, wherein:

said checking includes the first, mobile radio unit comparing, in response to said activate-ambiance-listening message, the identifier of the second radio unit with identifiers, stored in the first, mobile radio unit, of those radio units which are authorized to activate the ambiance listening function at the first, mobile radio unit and, if the identifier of the second radio unit is so stored in the first, mobile radio unit, the first, mobile radio unit starting said ambiance listening and transmitting to the second radio unit on a direct mode radio channel.

5. The method of claim 4, wherein:

as the second radio unit performs said commanding of the first, mobile radio unit to transmit the ambient sounds to the second radio unit, the second radio unit transmitting on a direct mode channel the identifier of a particular direct mode radio channel on which the second radio unit wants the first, mobile radio unit to transmit the ambient sounds.

6. The method of claim 4, further comprising:

the second radio unit commanding the first, mobile radio unit to stop transmitting ambient sounds to the second radio unit on a direct mode radio channel by sending the first, mobile radio unit a deactivate-ambiance-listening message on a reverse signalling channel.

7. The method of claim 4, further comprising:

the second radio unit commanding the first, mobile radio unit to stop transmitting ambient sounds to the second radio unit on a direct mode radio channel at a moment determined by the second radio unit, by placing in said activate-ambiance-listening message information indicating when the first, mobile radio unit should stop transmitting ambient sounds on a direct mode radio channel to the second radio unit.

8. The method of claim 1, wherein the step of the first, mobile radio unit checking the listening authority of the second radio unit comprises the following steps:

in response to said commanding by the second radio unit, the first, mobile radio unit generating a random number and transmitting said random number to the second radio unit on a direct mode radio channel, the first, mobile radio unit computing a reference number from said random number and a key number characteristic of the first, mobile radio unit, and storing said reference number in a memory of the first, mobile radio unit, in response to receiving the random number transmitted by the first, mobile radio unit, the second radio unit searching memory of the second radio unit for said key number characteristic of the first radio unit and computing a response number from said key number characteristic and the random number that the second radio unit has received from the first, mobile radio unit, and transmitting a resulting response number to the first, mobile radio unit on a direct mode radio channel, in response to receiving the response number transmitted by the second radio unit, the first, mobile radio unit comparing the response number received from the second radio unit, with said reference number stored in said memory of the first, mobile radio unit, and if the response and reference numbers are identical, the first, mobile radio unit acknowledging that the second radio unit has listening authority.

9. The method of claim 8, wherein:

as the second radio unit performs said commanding of the first, mobile radio unit to transmit the ambient sounds to the second radio unit, the second radio unit transmitting on a direct mode radio channel the identifier of a particular direct mode radio channel on which the second radio unit wants the first, mobile radio unit to transmit the ambient sounds.

10. The method of claim 8, further comprising:

the second radio unit commanding the first, mobile radio unit to stop transmitting ambient sounds to the second radio unit on a direct mode radio channel by sending the first, mobile radio unit a deactivate- ambiance-listening message on a reverse signalling channel.

11. A mobile radio unit for ambiance listening in which the mobile radio unit transmits ambient sounds, which may include voice, to a second radio unit over a direct mode radio path, comprising:

an electroacoustic transducer for detecting ambient sounds, a transceiver unit, means for transmitting ambient sounds detected by said electroacoustic transducer, through said transceiver on a direct mode radio path, memory means for storing the identifiers of respective other radio units that are authorized to activate ambiance listening at said mobile radio unit by sending an activate-ambiance-listening message over a direct mode radio path to send mobile radio unit, means for comparing the identifier contained in a activate-ambiance-listening message transmitted by a respective one of said other radio units with the identifiers stored in the memory means, and if it appears from said comparing that a same identifier is found in the memory means and in the activate-ambiance-listening message, for activating ambiance listening by said mobile radio unit.

12. A radio unit for ambiance listening in which the mobile radio unit transmits ambient sounds, which may include voice to a second radio unit over a direct mode radio path:

an electroacoustic transducer for detecting ambient sounds, a transceiver unit, means for transmitting ambient sounds detected by said electroacoustic transducer through said transceiver on a direct mode radio path, means for generating a random number and transmitting said random number on a direct mode radio path to the second radio unit;

memory means for storing a key umber characteristic of the mobile radio unit;

means for computing a reference number from said random number and said key number and for storing that reference number;

means for comparing said reference number with a response number received by the mobile radio unit from the second radio unit and, if the reference and response numbers are identical, for activating ambiance listening function by the mobile radio unit.

13. A commanding radio unit for commanding ambiance listening in which the mobile radio unit, upon command transmits ambient sounds, which may include voice, to the commanding radio unit over a direct mode radio path, comprising:

a transceiver unit, memory means for storing a random number received on it direct mode radio path by the commanding radio unit and the respective key number of each mobile radio unit whose ambiance listening function said commanding radio unit is authorized to activate; and means for computing a response number from the random number and the key number of the mobile radio unit that has sent the random number, and for sending the response number to the respective said mobile radio unit.

* * * * *